United States Patent [19]

Dugas et al.

[11] Patent Number: 5,697,752

[45] Date of Patent: Dec. 16, 1997

[54] OVERHEAD TRANSFER CLAMP ACTUATOR AND LINKAGE

[75] Inventors: Michael R. Dugas, Brighton; Patrick J. Kenny, Farmington Hills; Keith A. Oldford, Howell, all of Mich.

[73] Assignee: Progressive Tool & Industries Company, Southfield, Mich.

[21] Appl. No.: 502,282

[22] Filed: Jul. 13, 1995

[51] Int. Cl.$^6$ ................................................. B65G 21/20
[52] U.S. Cl. ........................... 414/225; 198/345.1; 29/783; 29/794
[58] Field of Search ............... 198/345.1, 346.2, 198/378; 29/783, 794, 822, 281.1; 414/222, 225

[56] References Cited

U.S. PATENT DOCUMENTS

| | | | |
|---|---|---|---|
| 3,774,548 | 11/1973 | Borst | 105/30 |
| 4,149,623 | 4/1979 | Nelson | 198/477 |
| 4,332,012 | 5/1982 | Sekine et al. | 364/468 |
| 4,781,285 | 11/1988 | Schlatter et al. | 198/774 |
| 4,848,533 | 7/1989 | Martin et al. | 198/470.1 |
| 4,905,986 | 3/1990 | Müller | 271/277 |
| 4,991,707 | 2/1991 | Alexander et al. | 198/346.1 |
| 5,011,068 | 4/1991 | Stoutenburg et al. | 228/4.1 |
| 5,067,606 | 11/1991 | Schlatter et al. | 198/465.1 |
| 5,141,093 | 8/1992 | Alexander | 198/345.1 |
| 5,427,300 | 6/1995 | Quagline | 228/4.1 |

FOREIGN PATENT DOCUMENTS

| | | |
|---|---|---|
| 2031698 | 7/1997 | Canada . |
| 0126716 | 11/1984 | European Pat. Off. . |
| 0201395 | 11/1986 | European Pat. Off. . |
| 2657071 | 7/1991 | France . |
| 042147 | 1/1961 | Germany . |
| 2947745 | 6/1980 | Germany . |
| 3607020 | 9/1986 | Germany . |
| 2620425 | 1/1988 | Germany . |
| 4100477 | 10/1994 | Germany . |
| 3294126 | of 1991 | Japan . |
| 448206 | 8/1927 | Russian Federation . |
| 1184257 | 3/1970 | United Kingdom . |
| 2164627 | 3/1986 | United Kingdom . |
| 2239850 | 7/1991 | United Kingdom . |
| 2256848 | 12/1992 | United Kingdom . |

OTHER PUBLICATIONS

Material flub in der Fertigung, Industrieroboter Auf Der Industrial Handling '82, 1982, pp. 242–244.

*Primary Examiner*—Karen B. Merritt
*Assistant Examiner*—Gregory A. Morse
*Attorney, Agent, or Firm*—Young & Basile, P.C.

[57] ABSTRACT

An apparatus for conveying panels, such as vehicle body side panels to and from work stations located at spaced locations along a conveyor includes a panel support frame mounted on the conveyor for movement along the conveying path with the support frame in an elevated generally horizontal conveying position. The support frame carries a plurality of mechanically actuable releasable clamps adapted to retain a panel engaged against a group of locator pads fixedly mounted on one side of the support frame. A second group of locator pads movably mounted on the frame are normally biased into engagement with the panel at spaced locations around its periphery to hold the panel in a predetermined position laterally of the support frame. The support frame mounts an actuator member coupled to all of the clamps to position all clamps in a panel clamping position when the actuator member is in a first position and to position all clamps in a panel release position when the actuator is in a second position. A coupling member on the support frame normally locks the actuator member against movement from either of its positions. The conveyor includes a manipulator operable when the support frame is at a work station to pivot the support frame downwardly from its conveying position to a downwardly inclined transfer position. Actuating devices located on the fixed frame at the work station are operable when the support frame is in its transfer position to release the coupling member, disengage the movable locator pads and shift the clamp actuator member between its first and second positions.

20 Claims, 9 Drawing Sheets

FIG-10

OVERHEAD TRANSFER CLAMP ACTUATOR AND LINKAGE

FIELD OF THE INVENTION

The present invention is directed to a handling apparatus employed to handle panel like articles, such as the main body panel components, which are to be subsequently assembled as a unitized vehicle body, to successively advance the panels to each of a series of work stations on a production line basis, and more particularly to the overhead transfer clamp actuator mechanism and linkage for releasibly engaging the panels during advancement of the articles between work stations.

BACKGROUND OF THE INVENTION

In the assembly of a unitized body, the first step in the assembly or framing of the body brings together at the first framing station on the body assembly production line various major panels, locates the panels in assembled relationship with each other and, while the panels are so located, welders weld the panels to each other to form a vehicle body shell. Typically, this first step in the framing process will involve a vehicle body floor panel, right and left hand body side panels, a fire wall panel and a roof panel or roof header members extending transversely between the upper portions of the body side panels. Once the panels are assembled to each other at the first framing station, access to portions of the individual panels at the interior of the body shell becomes restricted, and it is thus conventional practice to perform several preassembly steps on the individual panels before they are advanced to the framing station. In the case of a body side panel, for example, the panel is initially stamped from sheet metal, and is then advanced through a series of work stations where additional parts, such as door latch and hinge reinforcements, mounting brackets, stiffeners, etc., are welded in place on the sheet metal stamping.

In a commonly owned U.S. Pat. No. 4,991,707 issued on Feb. 12, 1991 there is disclosed a conveyor for conveying a panel to a series of work stations where the preframing operations referred to above are performed on the panel. The conveying system includes a carrier mounted for movement along an elevated horizontal path extending past a series of work stations. A generally rectangular open support frame is mounted along one edge on the carrier for pivotal movement relative to the carrier about a horizontal axis parallel to the conveying path. While the carrier is being advanced from one work station to the next, the support frame is maintained in a horizontal elevated position well clear of the plant floor. The panel, during this transfer step, is held against the underside of the support frame by what will be referred to generally as a plurality of clamps. On arrival at a work station, the carrier is stopped and a manipulator associated with the conveyor pivots the support frame downwardly to a vertically inclined or vertical position relative to the carrier to locate the panel in adjacent relationship with a stationary panel receiving work frame at the work station. The panel is transferred to the stationary work frame and the support frame is then pivoted back upwardly to its horizontal position clear of the panel on the work frame. After the work operations have been performed on the panel while the panel is held on the stationary work frame, the support frame is again pivoted downwardly, the panel is reclamped to the support frame, and the support frame with the panel is then pivoted back upwardly to its horizontal position relative to the carrier for advancement to the next work station.

In the panel conveying system described above, the irregular shape of the panel requires that several individual releasable clamps be located on the support frame to positively retain the panel on the frame during transit from one stationary panel receiving frame to the next. To facilitate transfer of the panel back and forth between the support frame and stationary work frame, it is essential that all of the several clamps be simultaneously released or engaged. The length of the conveying path and the requirement of pivotal movement of the support frame relative to its carrier makes it impractical to connect pneumatic or hydraulic supply lines or electrical cables to the individual support frames to pneumatically or electrically actuate the clamping devices. The clamps, and the clamp actuating devices must thus be so designed that the clamps are positively retained in their clamping position during transfer movement of the support frame and positively retained in their unclamped configuration while the support frame is separated from the panel at the work station.

In a commonly owned U.S. Pat. No. 5,141,093 issued Aug. 25, 1992, there is disclosed a conveyor for conveying a body side panel to a series of work stations where the clamp actuator is located at a common location on the stationary work frame of each work station and operatively engages associated coupling members on the moveable panel support frame when in the lowered position of each respective work station. It is difficult to provide a common location for the clamp actuator position at all work stations, since the desired location may interfere with preframing operations at one work station while being acceptable at all other work stations. In addition, the proper alignment of the moveable support frame coupling members with the stationary work frame clamp actuator is difficult to obtain initially, and difficult to maintain over time. The system requires precise positioning of the carrier along the elevated horizontal path with respect to the stationary work frame of each work station, and precise positioning of the support frame as it pivots from the elevated transport position to the lowered panel transfer position for proper operable engagement with the clamp actuator on the stationary work frame of each work station. Therefore, it would be desirable to provide an overhead clamp actuator and linkage apparatus that overcomes these disadvantages.

SUMMARY OF THE INVENTION

The present invention is especially directed to a clamping system in which a plurality of individual clamping or positioning devices carried on the support frame may be simultaneously shifted between their respective panel clamping or retaining positions and respective released or retracted positions and in which the clamps or locators are positively retained in either of their actuated or released positions.

In accordance with the present invention, a support frame adapted to be mounted along one edge on the carrier of a conveyor as described above is formed as an open frame of a configuration determined by the shape of the side panel which is to be handled by the frame. For purposes of description, the support frame may be considered as a generally flat rectangular frame whose outer dimensions approximate the length and height of the side panel to be handled so that the side panel can be mounted in a stable position on one side of the frame. To locate and retain a side panel on the frame, a number of locating and panel retaining devices or clamps are mounted at various locations on the frame chosen so that they will cooperatively retain a side panel in a fixed preselected position relative to the frame.

Two types of locating devices may be employed. The first type of locating device can simply be a pad or pin fixedly mounted on the support frame to engage the outer side surface of the body panel which, when it is retained on the support frame, faces the support frame. A second type of locating device can take the form of a pad which is movable between a first position in which it engages an edge surface of the body side panel and a retracted position in which the locating pad is retracted clear of the body panel to accommodate loading or unloading of the panel to or from the support frame.

A number of panel retaining or clamping devices are also mounted at appropriate locations on the support frame. Typically the clamping or retaining device will include a generally L-shaped panel engaging member pivotally mounted on the support frame for movement between a retaining position in which the retaining member projects inwardly beyond an edge of the panel to engage the inner side of the panel to lightly clamp the panel against the stationary locating pads described above.

An actuating shaft is mounted on the support frame for rotary oscillation about a shaft axis which is fixed relative to the support frame. An actuating crank is rotatively fixed at one end to the shaft and operably connected to a coupling member for actuation by the drive device when in the lowered position at the work station. Other crank arms rotatively fixed to the shaft are individually coupled by links to the respective clamping or retaining members in a manner such that when the actuating shaft is at one end limit of rotary oscillation, all clamps are in their panel retaining position, and when the actuating shaft is at its opposite end limit of movement, all clamps are located in their panel releasing or retracted positions. A lock device is provided operably mounted on the carrier end plate and the coupling member to positively lock the actuating shaft at either of its end limits of rotary oscillation to thereby positively retain the clamps in either of their panel retaining or panel release positions when the support frame is in the raised or transport position.

Each work station is provided with a power driven clamp actuating device and a lock releasing device. The lock releasing device at the work station is accomplished by a stationary abutment surface or cam member having cam surfaces formed thereon located on the carrier. The cam surfaces are located to engage and retain a cam follower with first or second cam surfaces corresponding to clamp released and engaged positions. The cam surfaces only release the cam follower carried with respect to the support frame when the support frame approaches its end limit of downward pivotal movement toward the stationary panel receiving work frame at the work station. The clamp actuating device includes a drive member mounted on the fixed frame for reciprocation along a fixed path at the work station and having an downwardly opening U-shaped recess which will receive a roller mounted on a coupling member connected to the actuating crank on the support frame, when the support frame is at its downward end limit of movement toward the panel receiving work frame at the work station. A power driven actuating device is operable to position the drive member at either of two end limits of linear reciprocation which correspond to the opposite end limits of rotary oscillation of the coupling member and crank actuating arm connected to the actuating shaft on the support frame. The drive member and coupling member are located in a corresponding positions, with both members either in the clamped position or the unclamped position.

As the support frame pivots downwardly on the conveyor to its end limit of movement toward the stationary panel receiving work frame, the roller of the coupling member enters the U-shaped recess in the drive member. The power driven actuating device is then actuated to shift the drive member to its opposite end limit of movement and in so doing, the engagement of the drive member with the roller of the coupling member rotates the actuating shaft to the opposite position, either the engaged or released position. For example as described above, after the side panel has been transferred from the support frame to the panel receiving work frame and the actuating shaft rotated to the clamp released position, the support frame is pivoted upwardly on the conveyor to its horizontal or raised position. When not transporting a panel between work stations, the support frame would normally be positioned in the raised position with all clamps released. After the work operation has been performed on the body panel, the support frame is pivoted downwardly again and, as it approaches its end limit of pivotal movement toward the panel receiving work frame, the roller again enters the U-shaped recess in the drive member. After the body panel has been positioned on the support frame, the drive member is driven back to its other end limit of linear reciprocation, and this movement of the drive member through drives the coupling member to rotate the actuating shaft on the support frame to reset the clamps to the engaged or clamping position to hold the panel with respect to the support frame while being moved to the raised position and transported to the next work station. The various locating pads on the support frame may likewise be actuated and released by operation of the actuating shaft.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
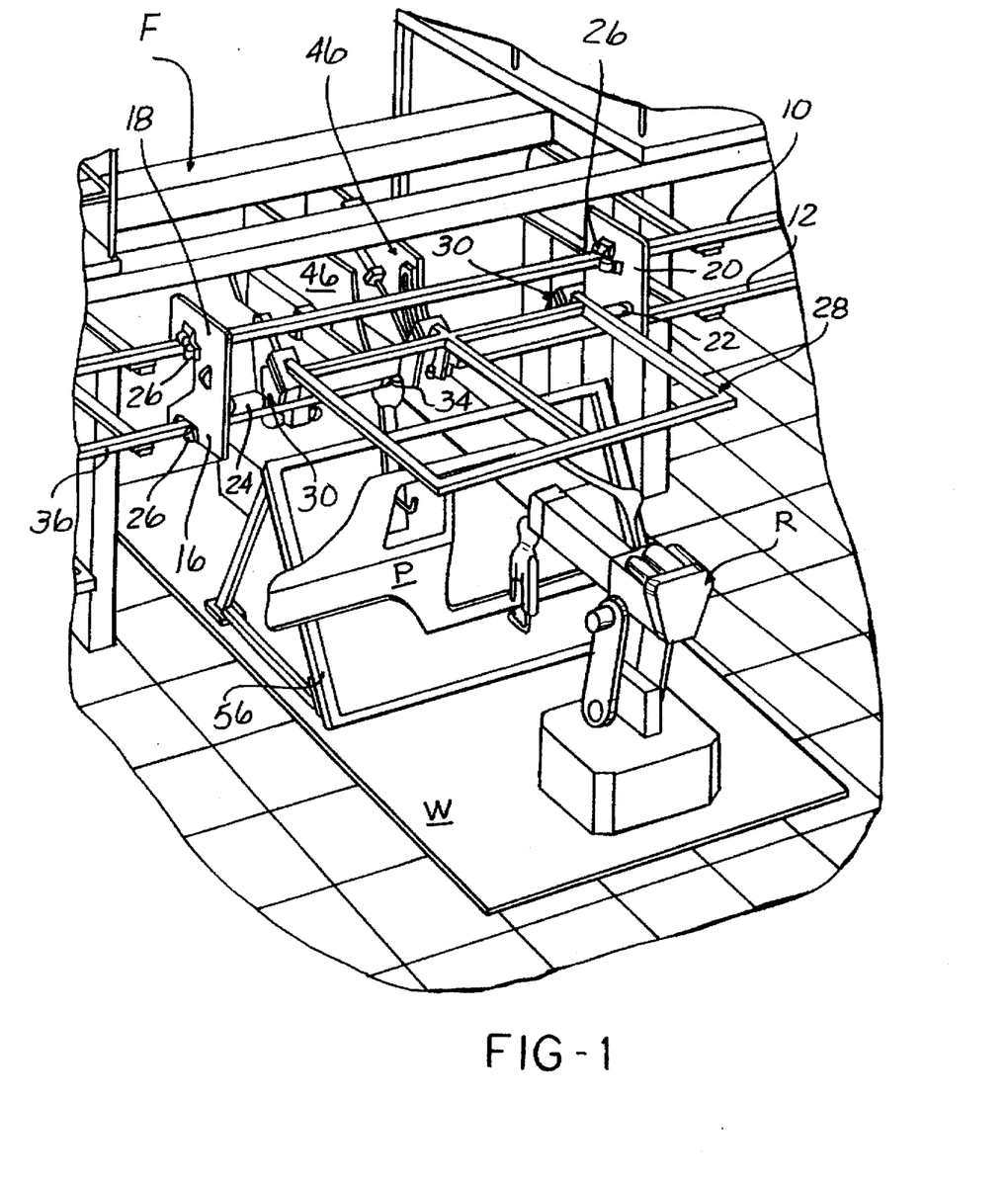
FIG. 1 is a simplified perspective view with various parts omitted of a conveying system and work station to which the present invention is applicable.
Figure 2:
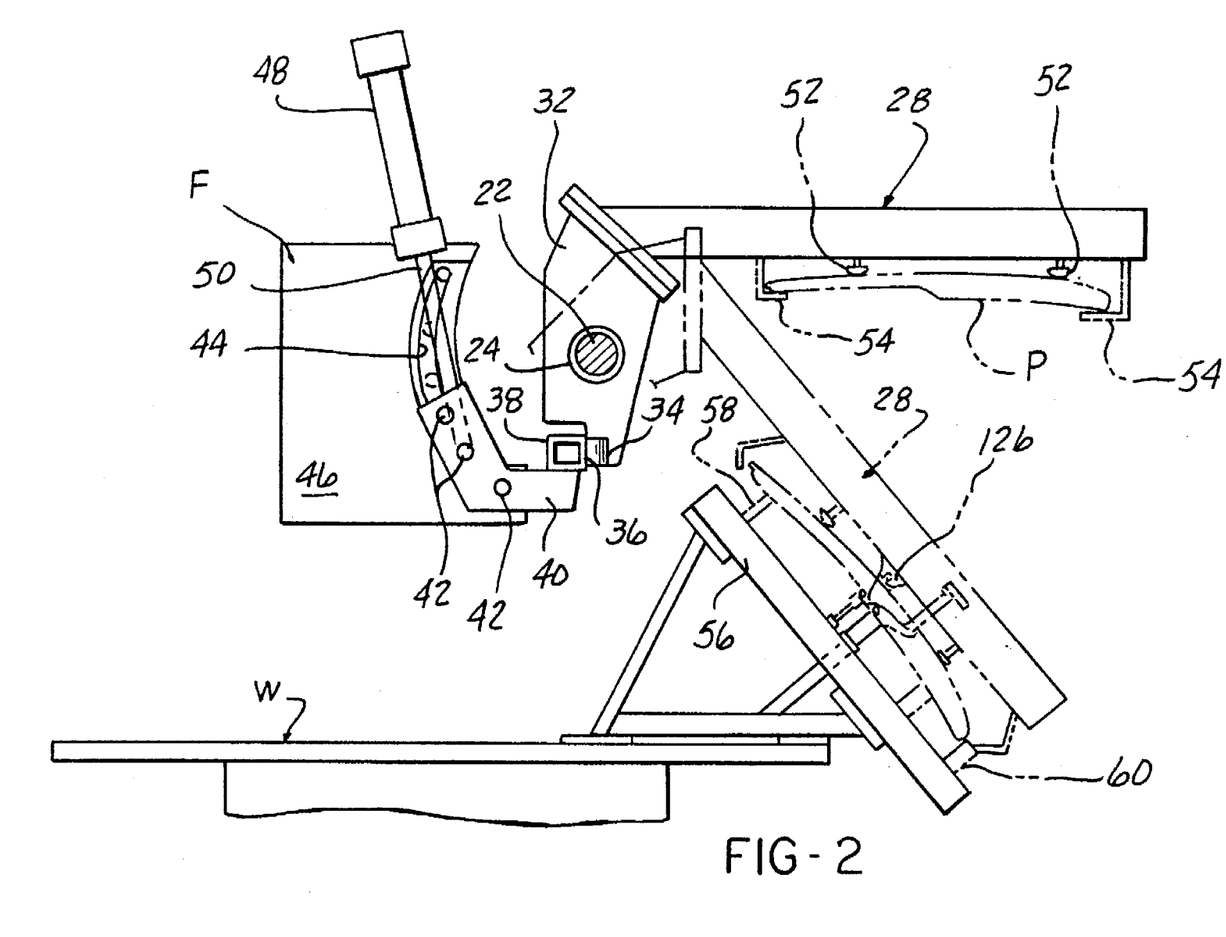
FIG. 2 is a simplified end view showing a portion of the conveying system shown in FIG. 1 and a somewhat modified form of work station.

Referring first to FIGS. 1 and 2, a conveying system of the type which employs the present invention is disclosed in simplified form with many structural details omitted. A conveying system of the type shown in FIGS. 1 and 2 is disclosed and described in detail in commonly owned U.S. Pat. No. 4,991,707 issued on Feb. 12, 1991 and U.S. Pat. No. 5,141,093 issued Aug. 25, 1992, which are incorporated herein by reference and to which reference may be had for further details of the system in general.

The conveyor system of the present invention includes a pair of horizontally extending rails 10 and 12 which are fixedly mounted on the fixed frame F of the conveyor. A carrier designated generally 16 includes a pair of end plates 18, 20 which are fixedly secured to each other by a horizontally extending rigid shaft 22 on which is rotatably supported a sleeve 24. The carrier 16 may include additional frame members secured to and extending between end plates 18 and 20, however, such additional members have been omitted from the drawings in order to provide a clearer view of other parts of the assembly. The two end plates 18, 20 are supported on rails 10 and 12 as by rollers 26. Carrier 16 is driven in movement along rails 10 and 12 by suitable drive means, not shown, which is operable to stop the carrier when the carrier is in operative alignment with work stations, such as the work station W. Typically, several work stations will be located at uniformly spaced locations along the conveying path defined by rails 10 and 12, and the carriers 16 will be driven in intermittent movement along rails 10 and 12 in incremental steps from one work station to the next.

A panel support frame designated generally 28 is fixedly mounted on the sleeve 24 as by mounting members 30, 32. The central mounting member 30 carries a plurality of rollers 34 which ride against a vertical side surface 36 of the lower rail 12. The engagement between rollers 34 and the side surface 36 of rail 12 normally maintains the support frame 28 in the generally horizontal position shown in FIG. 1.

Upper rail 10 is formed as a continuous fixed rail entirely fixedly supported from the fixed frame F. Lower rail 12 is formed with a relatively short moveable rail section 38 at each work station which normally is disposed in alignment with the fixedly mounted portions of lower rail 12. Rather than being mounted fixedly on the fixed frame F, as are the remaining major portions of lower rail 12, moveable rail section 38 is mounted, as best seen in FIG. 2, on a manipulator frame 40 which is supported as by rollers 42 mounted on each side of frame 40 which are received in curved roller tracks 44 mounted on frame plates 46 fixedly secured to fixed frame F. The curvature of roller tracks 44 follows a constant radius curve centered on the axis of sleeve 24. A drive motor, such as a hydraulic cylinder 48 coupled to frame F and a piston rod 50 coupled to manipulator frame 40, is employed to drive the manipulator frame in movement guided by roller tracks 44 from the normal position shown in full line in FIG. 2 in which the movable rail section 38 carried by manipulator frame 40 is in alignment with lower rail 12 and an actuated position in which frame 40 is shifted to the position shown in broken line in FIG. 2. When the manipulator frame 40 is in the full line position shown in FIG. 2, the support frame 28 is in the full line position of FIG. 2 with frame 28 lying in a horizontal general plane. When the piston rod 50 of the manipulator frame motor is retracted, the moveable rail section 38 moves from the full line position in clockwise movement about the axis of shaft 22, with sleeve 24 rotating relative to shaft 22. The weight of the horizontally projecting support frame maintains the rollers 34 on the mounting member 32 in contact with the side surface 36 of rail section 38 so that the support frame 28 pivots downwardly from the full line position shown in FIG. 2 to the broken line position indicated.

Support frame 28 is provided with a number of locator and retaining members (not shown in FIG. 1) which are operable to releasably retain and locate a body panel P on the underside of frame 28 when the frame is in its normal horizontal position shown in full line in FIG. 2. The number and locations of the locating and retaining members is entirely dependent on the configuration of the particular panel P being handled. In FIG. 2, two locator members 52 are indicated in broken line as are two retainer members 54. The number and locations of locator members 52 and retaining members 54 as shown in FIG. 2, is intended simply to indicate the general manner in which panel P is retained on support frame 28—in actual practice additional locator and retainer members will be employed. As most clearly shown in FIG. 2, a panel receiving work frame 56 is fixedly mounted at work station W in a position and orientation to receive a panel P from support frame 28 when the frame 28 is in the broken line position indicated in FIG. 2. The panel receiving work frame 56 will be provided with suitably located pads and locating members such as 58, 60 to support the panel on the stationary receiving work frame in a fixedly located position with respect to assembly tooling, such as the robotic welder R illustrated in FIG. 1. The panel receiving work frame 56 may also be provided, where appropriate, with releasable clamps, not shown.

Mounted on the fixed frame F at work station W is a clamp actuator assembly designated generally 64 best seen in FIGS. 5–11, which will be described in greater detail below. Clamp actuator assembly 64 functions to release the various releasable retainer members 54 or clamps which are mounted on support frame 28 when the frame arrives at the broken line transfer position shown in FIG. 2.

As previously stated, FIGS. 1 and 2 are extremely simplified drawings intended simply to illustrate how the panel carrying support frame 28 is conveyed and manipulated. Thus, many structural details have been omitted from these two figures in that the scale of these figures, particularly FIG. 1, is too small to clearly illustrate details of the retaining and latch actuating mechanisms to which the present invention is directed and further because the configuration of support frame 28 and the location of the various locator and retaining devices on the support frame will vary in accordance with the configuration of the specific panel being handled by the apparatus. Details of the locating and clamp actuating devices to which the present invention is directed are best seen in FIGS. 3–11.

Figure 3:
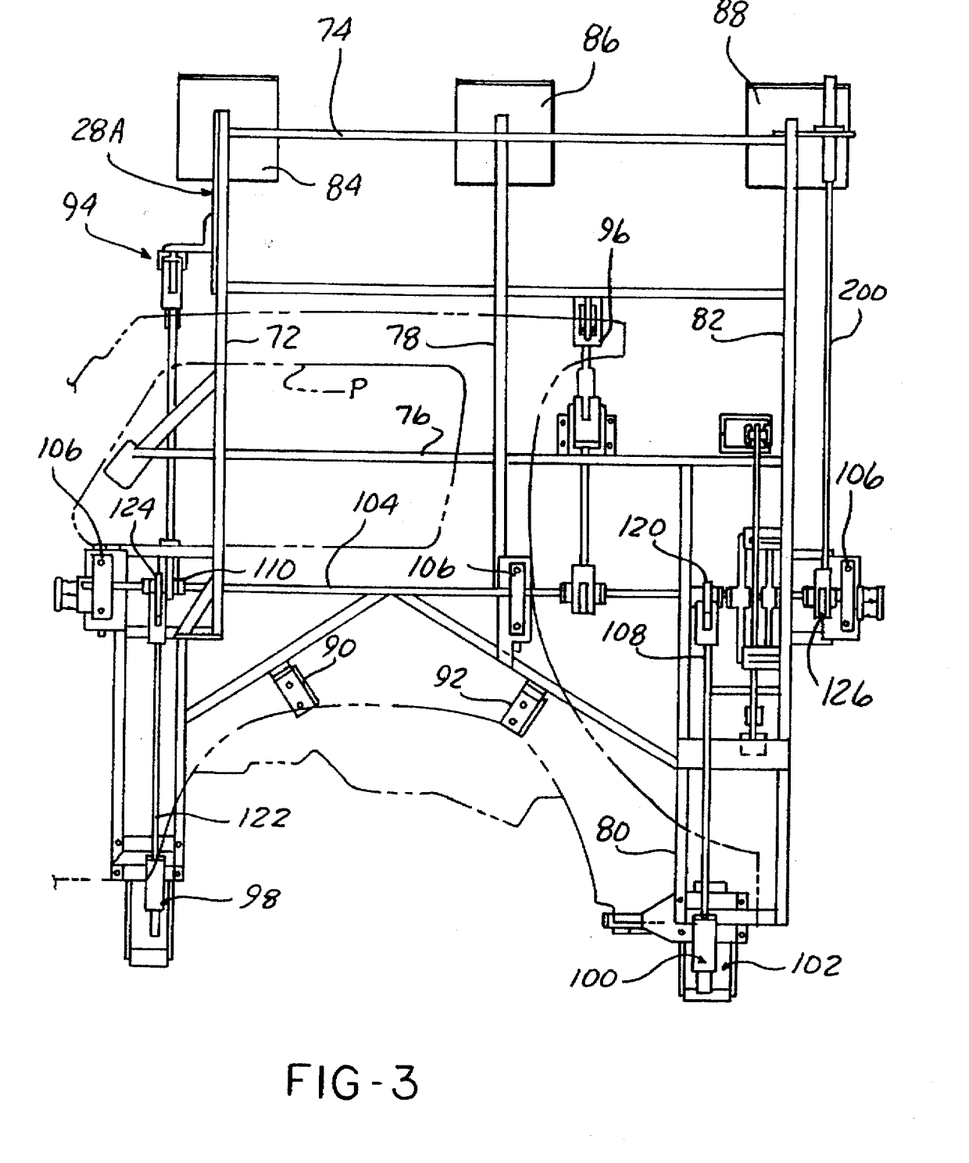
FIG. 3 is a top plan view of a support frame embodying the present invention with certain parts omitted for the sake of clarity.

Referring first to FIG. 3, a typical support frame designated generally 28A corresponding to the simplified frame 28 of FIGS. 1 and 2 is shown in top plan view as including an open frame work made up of rigidly interconnected longitudinally and transversely extending frame members such as 72, 74, 76, 80, 82, etc. The overall shape of the frame as viewed in plan depends to a large extent on the overall shape of the panel P which is to be handled by the frame. Support frame 28A includes fixedly mounted mounting plates 84, 86 and 88 adapted to be fixedly mounted on the support members such as 30, 32 of a carrier 16 referred to above in the description of FIGS. 1 and 2.

A number of fixedly mounted locator pads, two of which are indicated in FIG. 3 at 90 and 92 are fixedly mounted at selected locations on frame 28A to function in the manner of locator pads 52 as shown in FIG. 2—that is to engage the outer side surface of the panel P which is located below frame 28A as viewed in FIG. 3. It will be appreciated that while only two stationary pads 90, 92 are illustrated, additional pads will be employed, where necessary.

A plurality of pivoted retainer or clamp assemblies designated generally 94, 96, 98 and 100 are mounted on frame 28A to function in a manner similar to the retainer members 54 of FIG. 2. Again, the number and locations of retainer or clamp assemblies such as 94, 96 and their specific location on the support frame is determined by the configuration of the panel P being handled. In addition to the pivoted retainer or clamp members 94, 96, 98 and 100, one or more retractable locator members, one of which is indicated generally at 102 in FIG. 3 may be mounted on frame 28A. The fixed locating pads 90, 92, the pivotable retainer or clamp assemblies such as 94, 96, etc., and the retractable locator members such as 102 all project downwardly from the lower side of frame 28A as viewed in FIG. 3 to locate the panel P in spaced relationship below the bottom side of frame 28A.

Mounted on the upper side of frame 28A is a transversely extending shaft 104 supported on frame 28A for rotation about its axis as by pillow block 106 mounted on frame 28A.

Figure 4:
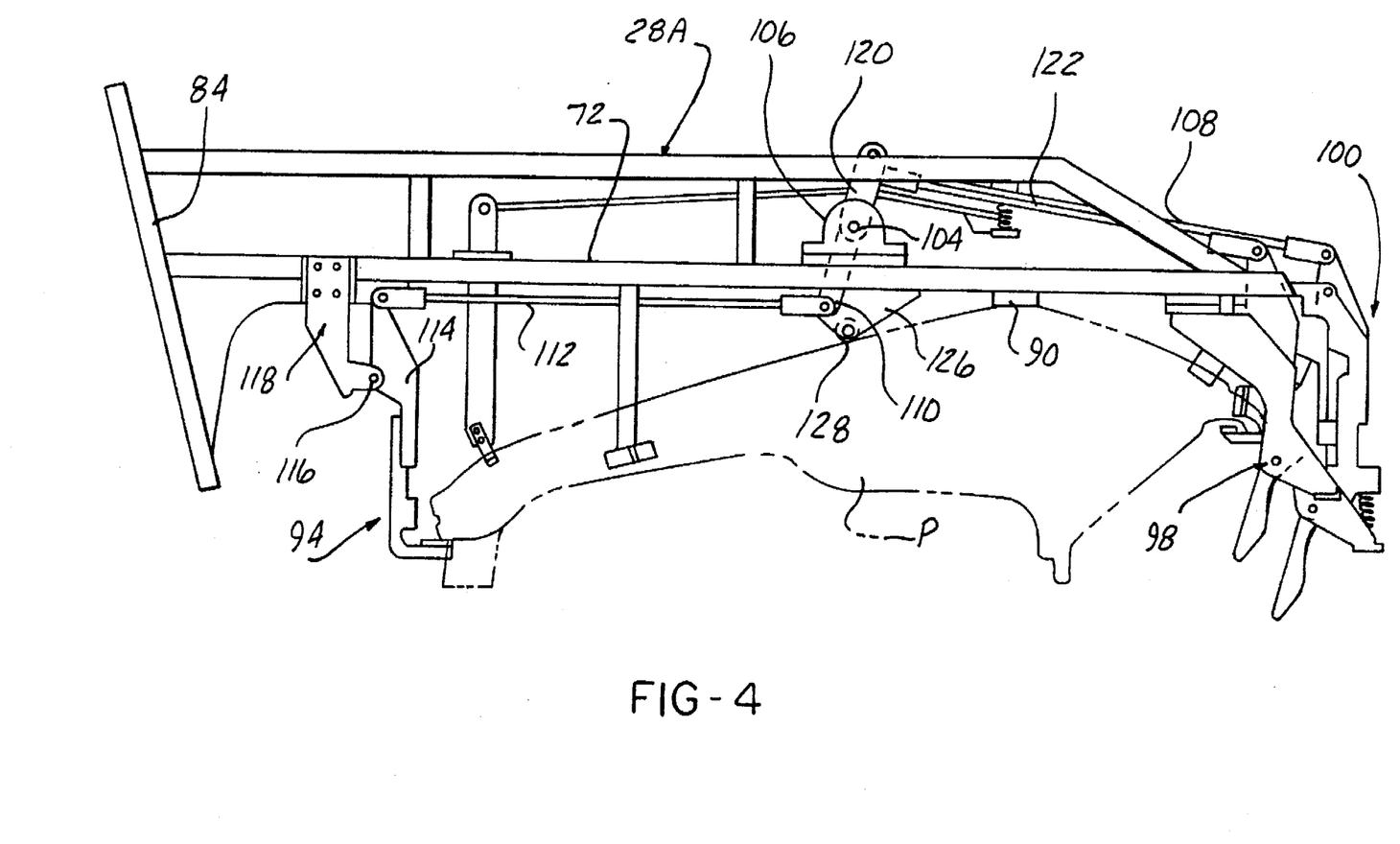
FIG. 4 is an end view of the support frame of FIG. 1, again with certain parts omitted.

As best seen in FIG. 4, a plurality of crank arms such as 110, 120 are rotatably fixed to shaft 104 to project upwardly or downwardly generally from the shaft. These crank arms are coupled by links to the various clamping or retainer assemblies 94, 96, 98 and 100, a link 112, for example, being pivotally connected at one end to the crank 110 and pivotally connected at its opposite end to a clamp retainer member 114 which is pivotally mounted as at 116 on a mounting bracket 118 fixed to frame 28A. Another link 108 similarly extends from a crank 120 on shaft 104 to a pivotally mounted member of clamp assembly 100, while another link 122 extends from still another crank 124 on shaft 104 to the clamp assembly 98. The clamp assembly 96 of FIG. 3 is not shown in the side view of FIG. 4 for purposes of clarity.

Referring to FIG. 4, it is seen that if shaft 104 is rotated in a counterclockwise direction, this rotation of the shaft will cause crank 110 to draw link 12 to the right as viewed in FIG. 4, thus driving the pivoted clamp member 114 in clockwise movement about its pivot 116 to thereby withdraw the lower end of clamp 114 clear of the edge of the panel P. Similarly, those cranks, such as 120, on shaft 104 which project upwardly from the shaft will draw their respective links 122, 108, to the left as viewed in FIG. 4 to release the various clamps or retainer members coupled to the links. A subsequent actuation of crank 126 and shaft 104 to the original positions illustrated in FIG. 4 will relocate the various clamps and retaining members in their clamping or retaining positions.

Figure 5:
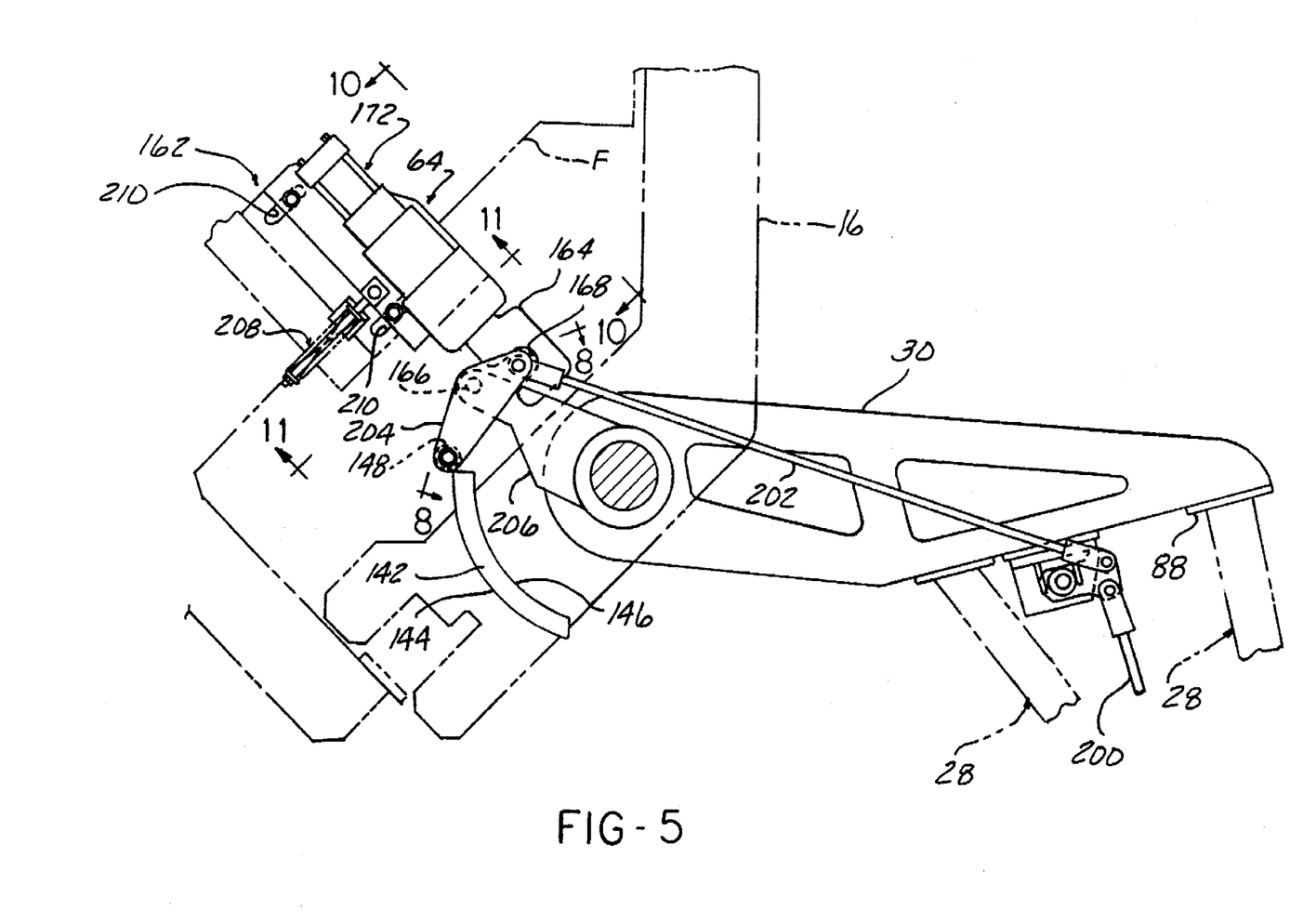
FIG. 5 is a simplified end view showing a portion of the conveying system shown in FIG. 1 with a mounting member in a lowered position and a clamp actuator in a clamped position.
Figure 6:
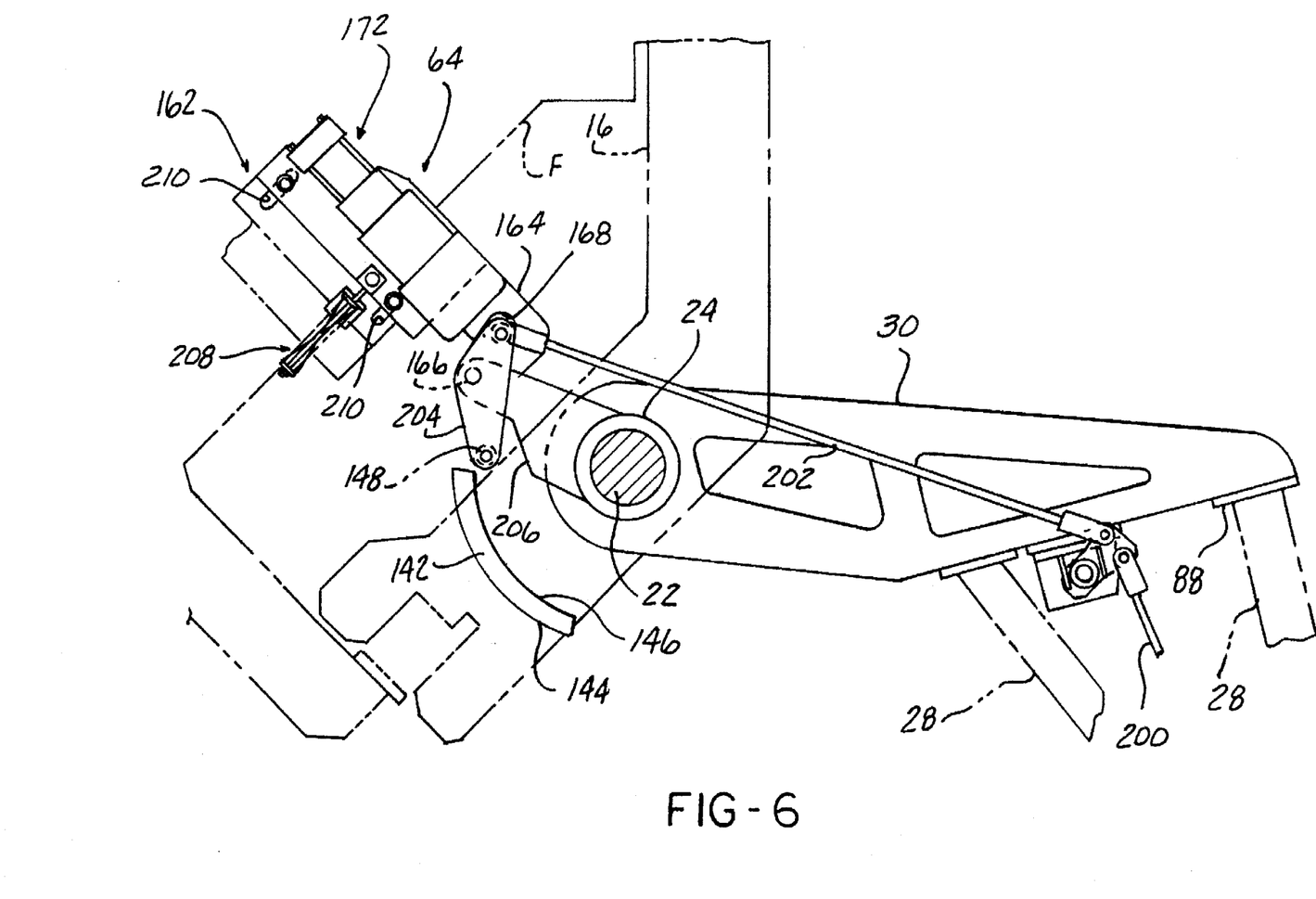
FIG. 6 is a simplified end view showing a portion of the conveying system shown in FIG. 1 with a mounting member in a lowered position and a clamp actuator in a retracted position.
Figure 7:
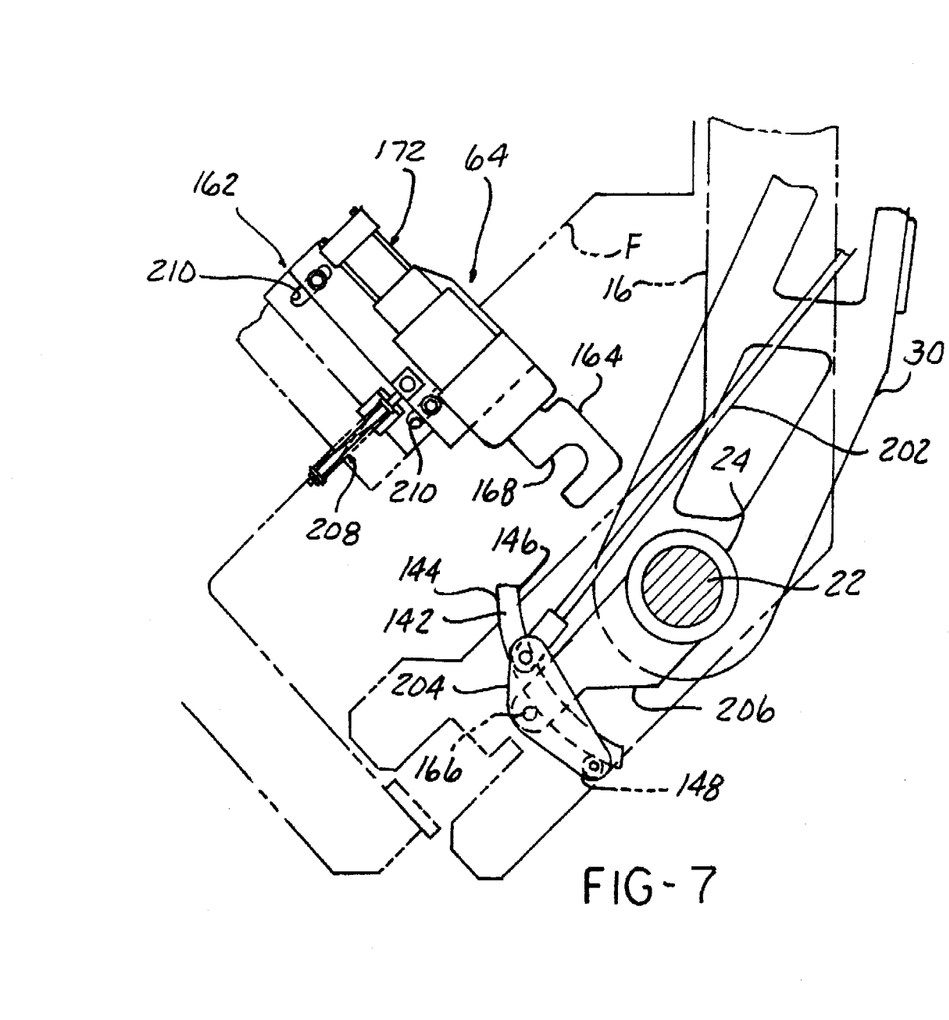
FIG. 7 is a simplified end view showing a portion of the conveying system shown in FIG. 1 with the mounting member in a raised position and the clamp actuator locked in a clamping position.
Figure 8:
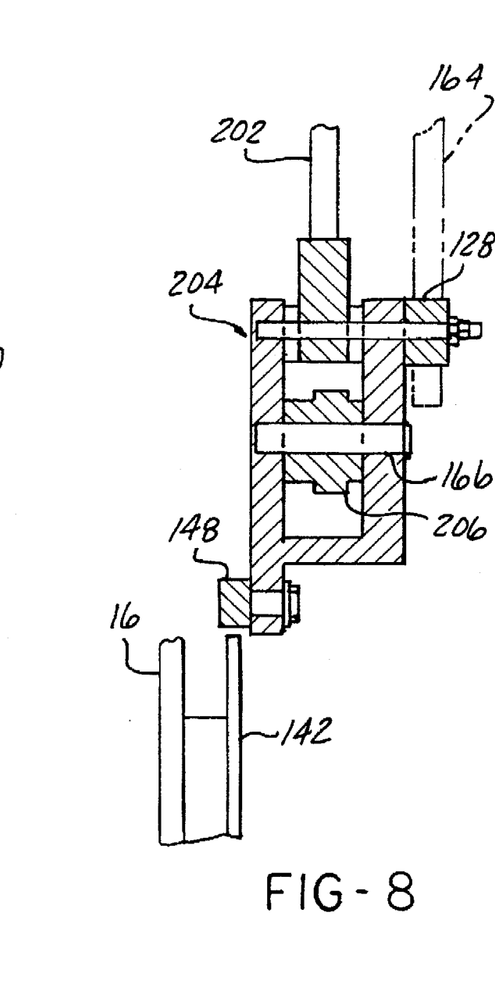
FIG. 8 is a partial cross-sectional view taken as shown in FIG. 5 showing details of a clamp actuator drive member, a clamp actuator coupling member and cam member.

In addition to the various clamp actuating cranks described above, a shaft actuating crank 126 is fixedly secured to shaft 104 and is connected through various links 200 (best seen in FIGS. 3, 5 and 6) and link 202 (best seen in FIGS. 5 and 6) to connect to the coupling member 204. Referring now to FIGS. 5–8, the coupling member 204 can be driven in response to actuation of the cylinder 172 about pivot 166 between first and second end limits of travel corresponding to the clamped position and released position of the shaft 104. As illustrated in FIG. 5, the mounting member 30 is in the lowered position to position support frame 28 in close proximity to the work frame, such as 56 illustrated in FIG. 2. In this position, the cam follower roller 148 is disengaged from the cam member 142 so that the pneumatic cylinder 172 can be actuated to drive the drive member 164 between its first and second end limits of travel. In this position, the roller 128 (best seen in FIG. 8) is engaged within the recess 168 (best seen in FIG. 7 or 9) of the drive member 164. When in the clamped position as illustrated in FIG. 5, the manipulator, such as hydraulic cylinder 48 (seen in FIG. 2) can be actuated to move the mounting member 30 from the lowered position to the raised position as illustrated in FIG. 7. In the position as illustrated in FIG. 7, the roller 128 is disengaged from the U-shaped recess 168 of the drive member 164, while the cam follower roller 148 is engaged with the cam surface 144 of the cam member 142 to lock the locator members and retainer members in the clamped position. The pivot 166 is supported from the sleeve 24 by radially extending arm 206, so that the coupling member 204 and associated roller 128 and cam follower roller 148 move in conjunction with rotation of the sleeve 24 about the shaft 22, which also corresponds to movement of the mounting member 30 supported from the sleeve 24 and frame 28 supported from mounting member 30.

Figure 9:
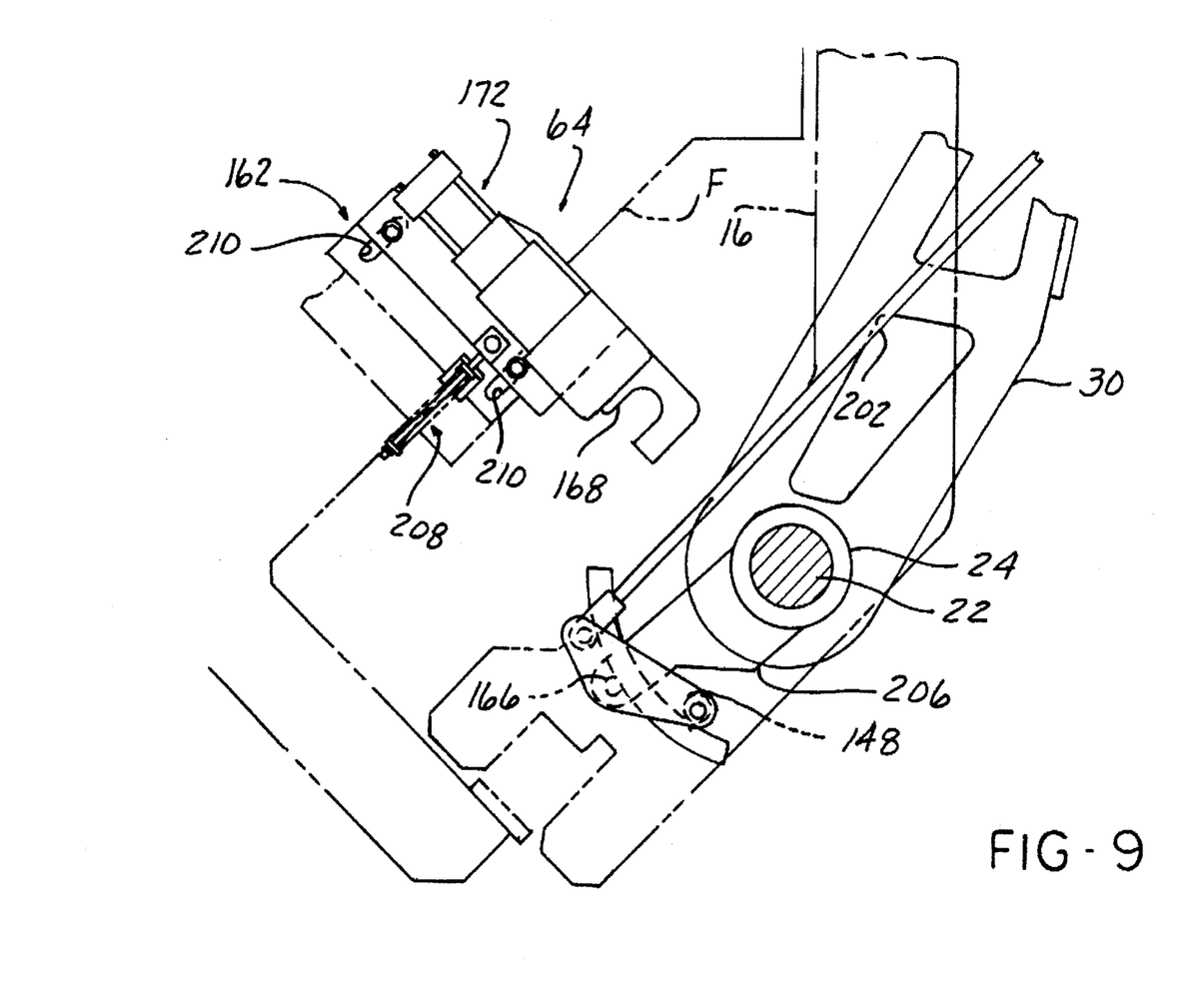
FIG. 9 is a simplified end view showing a portion of the conveying system shown in FIG. 1 with the mounting member in a raised position and the clamp actuator locked in a released position.

After movement of the carriage 16 between workstations, the manipulator, such as hydraulic cylinder 48, is actuated to rotate the frame 28 and associated mounting members 30, 32 and sleeve 24 about shaft 22 to move from the elevated position to the transfer position, such as that illustrated in FIG. 2. The movement causing the coupling member 204 to move from the position illustrated in FIG. 7 to a position corresponding to that illustrated in FIG. 5. When in the position of FIG. 5, the pneumatic cylinder 172 is actuated to move the drive member 164 from the extended position to the retracted position as illustrated in FIG. 6 to correspondingly move the locator member and retainer members from the clamped position to the released position to deposit the panel being transported by the carrier 16 between workstations to the work frame 56 as illustrated in FIG. 2. The manipulator, such as hydraulic cylinder 48 is then actuated to move the frame 28 and associated mounting member 30, sleeve 24, arm 206 and coupling member 204 about the shaft 22 to the raised position as illustrated in FIG. 9. In this position as illustrated in FIG. 9, the roller 128 is disengaged from the U-shaped recess 168 of the drive member 164 and the cam follower roller 148 is engaged with the cam surface 146 of the cam member 142 to lock the locator members and retainer members in the released position. When the pre-framing operations have been performed on the panel at the work frame 56 of the workstation are completed, the manipulator, such as hydraulic cylinder 48, is actuated again to move the frame 28 from the elevated position as illustrated in FIG. 9 to the transfer position illustrated in FIG. 6. In the position illustrated in FIG. 6, the roller 128 is again engaged within the U-shaped recess 168 of the drive member 164 allowing the pneumatic cylinder 172 to be actuated from the retracted position (shown in FIG. 6) to the extended position (shown in FIG. 5) to drive the coupling member 204 about the pivot 166, which correspondingly moves the locator members and retainer members to the clamping position on the support frame 28. When in the clamping position, the manipulator, such as hydraulic cylinder 48, can again be actuated to move the frame 28 from the transfer position (shown in FIG. 5) to the elevated position (shown in FIG. 7). The support frame 28 must be at its lower end limit of movement relative to the carrier 16 of the conveyor before rotation of the shaft 104 can be accomplished, and therefore only when the panel support frame 28 is closely adjacent the panel receiving work frame 56 at the work station is it possible to move the locator members and retainer members between the clamping and release positions.

Figure 10:
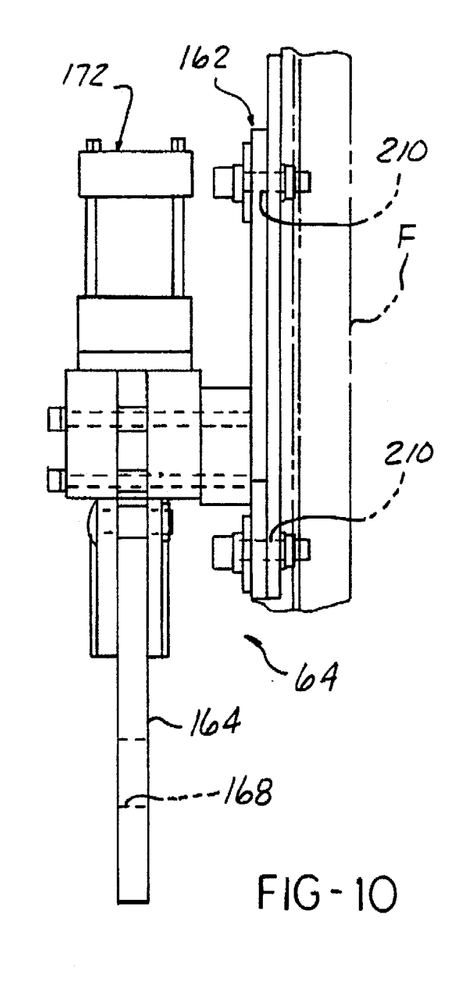
FIG. 10 is a partial cross-sectional view taken as shown in FIG. 5 showing details of a portion of the clamp actuator drive assembly.
Figure 11:
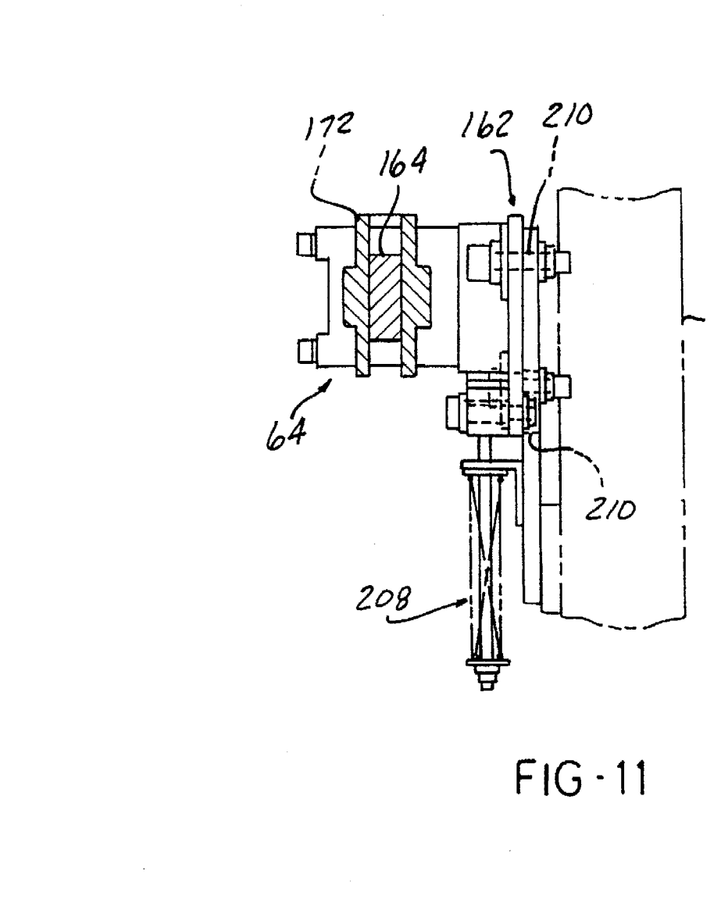
FIG. 11 is a partial cross-sectional view taken as shown in FIG. 5 showing details of a mounting for the clamp actuator drive assembly.

Referring now to FIGS. 10 and 11, details of the clamp actuator drive member 164 and pneumatic cylinder 172 mounting to the fixed frame F are illustrated. The coupling member assembly 204 and cam member 142 are carried by the carrier 16 and move from workstation to workstation as the carrier moves along the fixed frame F. A clamp actuator drive assembly 64 is mounted at each of the workstations to the fixed frame F for operative engagement with the roller 128 when the frame 28 is moved to the lowered or transfer position by the manipulator, such as hydraulic cylinder 48 shown in FIG. 2.

Details of clamp actuator 64 are best seen in FIGS. 5–11. The actuator includes a frame 162 located on the fixed frame F at each work station. A drive member 164 is mounted for reciprocal movement on frame 162. Drive member 164 is formed at one end with a downwardly opening U-shaped recess 168 whose width is somewhat greater than the diameter of the roller 128 on the coupling member 204 connected to the crank arm 126 of shaft 104 through links 200 and 202. The piston rod of a pneumatic cylinder 172 is coupled to drive member 164. Pneumatic cylinder 172 is mounted on fixed frame 162 with a spring biased support 208 allowing movement along a slot 210 formed in fixed frame 162 if required in response to excessive contact of the roller 128 of the coupling member 204 with respect to the drive member 164. The drive member 164 is shown in FIGS. 6 and 9 with its piston rod in a retracted position. At this time, a stop pad (not shown) fixedly mounted on coupling member 204 is engaged with a fixed stop mounted on carrier 16 to establish an end limit of movement of the coupling member 204 in a counterclockwise direction. On actuation of pneumatic cylinder 172 to extend its piston rod, coupling member 204 will be driven in clockwise movement about pivot 166 until a second stop pad (not shown) mounted on the coupling member 204 engages a fixed stop abutment on carrier 16. Cylinder 172 is connected in a conventional manner to a reversing valve to drive in either direction in accordance with the position of the valve. Control circuitry for controlling actuation of the cylinder 172 functions in a well known manner to maintain the piston rod at one end of its stroke until the circuit is actuated, at which time the piston rod is driven to the opposite end of its stroke and there maintained until the next subsequent actuation. Drive member 164 is thus normally located at one or the other of its end limit of movement.

In FIGS. 5 and 7, drive member 164 is shown at that end limit corresponding to a clamp closed position of crank 126. With drive member 164 in the position shown in FIG. 5 and crank 126 of shaft 104 in the position indicated, roller 128 on the coupling member 204 will be located within recess 168 of the drive member 164 when support frame 28A arrives at the lowered transfer position as illustrated in FIG. 5. With the cam follower 148 free of the corresponding cam surface 144 of cam member 142, cylinder 172 may now be actuated to retract its piston rod inwardly as viewed in FIG. 5 to the position illustrated in FIG. 6, thus causing the coupling member 204 to rotate counterclockwise about pivot 166 and in so doing to drive crank arm 126, and thus shaft 104 in counterclockwise rotation about the axis of shaft 104. The support frame 28 can then be moved from the transfer position of FIG. 6 to the raised position of FIG. 9 causing the cam follower 148 to lock the locator and retainer members in position.

OPERATION

The conveying path defined by conveyor rails 10 and 12 typically will extend past several work stations uniformly spaced along the conveyor path. At each work station, the conveyor will be provided with a manipulator assembly operable to pivot the support frame 28 or 28A from the generally horizontal conveying position shown in FIG. 1 to and from a lowered position where the support frame is closely adjacent a panel receiving frame such as 56 (FIG. 2) at the work station. Depending on the work operation to be performed, the panel receiving frame may be located in an inclined position such as that of the receiving frame 56 shown in FIG. 2 or the receiving frame may be located in a vertical position. Each work station will include a clamp actuator such as 64, a lock release device 154.

The first station at the upstream end of the conveyor line is a loading station at which the panel P is loaded on its support frame 28 or 28A. To accomplish this loading, the manipulator at the loading station is actuated to lower the support frame to its lowered position at which the movable locating devices are located in their disengaged position. If the various clamping devices, such as 98, on the frame are in their clamping position, clamp actuator 64 is actuated to release the clamps.

The panel P is then positioned on the frame 28A with the side surface of the panel facing frame 28A engaging all of the various fixedly mounted pads on the support frame 28 or 28A. Clamp actuator 64 is then actuated as described above, to swing the various clamping assemblies into the clamping position.

The manipulator is then actuated to swing the support frame, with the clamped panel, upwardly from the loading position to the transport position illustrated in FIG. 1. The support frame is then advanced along conveyor rails 10 and 12 to the first work station. On the arrival of the support frame at the first work station, the manipulator at that station pivots the support frame downwardly toward the panel receiving frame, (such as frame 56 of FIG. 2). The cam follower roller 148 on the coupling member 204 moves free from the cam surfaces 144 and 146 of the cam member 142 only when the support frame 28 reaches the transfer or lowered position, allowing the drive member 164 to be actuated with the roller 128 engaged within the U-shaped recess 168 to drive the actuating shaft crank 126 rotatably with respect to the shaft 104. The actuating device 64 is then actuated to drive its drive member 164 in the clamp opening direction, this movement of drive member 164 drives crank 126 through the coupling member 204 to rotate the actuating shaft 104. As described above, actuating shaft 104 is coupled by cranks on the shaft and links to the various clamping devices, such as 98, to pivot the various clamping devices to withdraw the panel supporting elements from beneath the panel P. Support of the panel P is then transferred to the panel receiving work frame 56 at the work station. The support frame 28 or 28A is then driven by the manipulator device, such as hydraulic cylinder 48, at the work station back to its elevated horizontal position to fully expose the panel P supported on receiving work frame 56 to tooling located at the work station.

After the work operation on the panel has been completed, the tooling is withdrawn from the panel and the support frame 28 or 28A is again driven by the manipulator back to its lowered position. The panel is then transferred from the receiving work frame 56 back into engagement with the various fixed pads as in the original loading operation, the clamp actuator 64 is actuated to restore the various panel retaining clamping devices, such as 98, to their panel clamping position, and the manipulator is then actuated to swing the panel upwardly away from the receiving work frame back to the substantially horizontal conveying or transport position. This process is then repeated at succeeding work stations with the panel being finally unloaded from the support frame 28 or 28A at the final work station.

As described above, the actuating shaft 104 and thus all of the pivotal clamps are positively retained in the position to which they have been last driven by a clamp actuator 64 by the engagement of the cam follower roller 148 (FIGS. 5–9) on either of cam surface side 144, 146 of the cam member 142. The only time cam follower roller 148 is disengaged from the cam surfaces of the cam member 142 is when the support frame 28A is at a closely adjacent fully lowered position. From the foregoing description of an operating cycle, it is believed apparent that all of the various shaft actuated clamps, such as clamp 98, are locked in either their clamping position or unclamping position at all times except when support frame 28 or 28A is either at or closely adjacent a fully lowered position at a work station or the panel P is supported by the panel receiving frame at a work station.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An article handling apparatus for transferring articles of relatively large panel-like form to and from a work station, said apparatus comprising:

support frame means for releasibly supporting a panel at one side thereof;

locating means, mounted on said frame means, for engaging and locating said panel in a predetermined position on one side of said frame means;

releasible retainer means, mounted on said frame means, for moving between a clamping position, wherein said retainer means engages said panel to cooperatively retain said panel engaged with said locating means, and a release position clear of said panel to accommodate movement of said panel into and out of engagement with said locating means;

coupling means, mounted on said frame means, for moving relative to said frame means between a first position and a second position;

linkage means for connecting said coupling means to said retainer means to locate said retainer means in said clamping position when said coupling means is in said first position and to locate said retainer means in said release position when said coupling means is in said second position;

drive means selectively operable when said frame means is at said work station for engaging and driving said coupling means in movement relative to said frame means to shift said coupling means from one of said first and second positions to the other; and manipulating means operable when said frame means is at said work station for shifting said frame means from an elevated position to a lowered position, wherein said coupling means is locked in one of said first and second positions until said frame means is shifted into said lowered position, said coupling means located adjacent said axis of said lift means.

2. The article handling apparatus of claim 1 further comprising:

conveying means for conveying said frame means along a fixed path extending past said work station with said frame means in an elevated position.

3. The article handling apparatus of claim 1 further comprising:

cam means, on said frame means, for engaging said coupling means to positively hold said coupling means in one of said first and second positions.

4. The article handling apparatus of claim 1 wherein said locating means comprises:

a first locating member fixedly mounted on said frame means to engage that side of said panel facing generally toward said frame means;

a second locating member mounted on said frame means for pivotal movement relative to said frame means into and out of engagement with a surface of said panel inclined from said frame means;

means biasing said second member into engagement with said panel; and second release means at said work station engageable with said second member to move said second member out of engagement with said panel in response to movement of said frame means to said lowered position.

5. An article handling apparatus for transferring articles of relatively large panel-like form to and from a work station, said apparatus comprising:

lift means for engaging said article to deliver said article to said work station and to remove said article from said work station, said lift means rotatable about an axis between a raised position and a lowered position for delivering and removing said article to and from said work station;

retainer means for holding said article with respect to said lift means, said retainer means moveable between a clamped position and a released position; and lock means for locking said retainer means selectively in one of said clamped position and said released position, said lock means moveable between a locked position and an unlocked position in response to rotational movement of said lift means between said raised position and said lowered position, said lock means located adjacent said axis of said lift means.

6. The apparatus of claim 5 further comprising:

said lock means selectively moveable between first and second locking positions corresponding to said clamped position and said released position of said retainer means when in said unlocked position, said lock means in said unlocked position only when said lift means is in said lowered position.

7. The apparatus of claim 5 further comprising:

rail means extending between work stations for supporting said lift means; and conveyor means for moving said lift means between work stations on said rail means.

8. The apparatus of claim 5 further comprising:

link means extending between said lock means and said retainer means for transferring movement of said lock means to said retainer means.

9. The apparatus of claim 5 further comprising:

said lift means including support frame means for releasibly supporting a panel at one side thereof and locating means, mounted on said frame means, for engaging and locating said panel in a predetermined position on one side of said frame means.

10. The apparatus of claim 5 further comprising:

manipulating means operable when said lift means is at said work station for shifting said lift means from an elevated position to a lowered position, wherein said retainer means is locked in one of said first and second positions until said lift means is shifted into said lowered position.

11. An article handling apparatus for transferring articles of relatively large panel-like form to and from a work station apparatus comprising:

lift means for engaging said article to deliver said article to said work station and to remove said article from said work station, said lift means rotatable about an axis between a raised position and a lowered position for delivering and removing said article to and from said work station;

retainer means for holding said article with respect to said lift means, said retainer means moveable between a clamped position and a released position; and lock means for locking said retainer means selectively in one of said clamped position and said released position, said lock means moveable between a locked position and an unlocked position in response to rotational movement of said lift means between said raised position and said lowered position, said lock means having a rotatable member carried on said lift means, said rotatable member having a cam follower connected thereto and selectively engageable with a first cam surface and a second cam surface stationary with respect to rotation of said lift means, and drive means for moving said rotatable member to selectively engage said cam follower with one of said first cam surface and said second cam surface, said drive means operable only when said lift means is in said lowered position, said first and second cam surfaces corresponding to said retainer means locked in said clamped position and locked in said released position respectively.

12. The apparatus of claim 11 further comprising:

means for mounting said drive means stationary with respect to said work station and adjacent said axis of said lift means for operable engagement with said rotatable member when said lift member is in said lowered position; and means for biasing said mounting means to permit limited movement of said drive means with respect to said axis of said lift means when said lift means is adjacent said lowered position.

13. The apparatus of claim 11 further comprising:

said drive means including an actuator moveable between first and second end limits of movement, and a coupling member operably connected to said reciprocal actuator and engageable with said rotatable member when said lift means is in said lowered position.

14. An article handling apparatus for transferring articles of relatively large panel-like form to and from a work station, said apparatus comprising:

lift means for engaging said article to deliver said article to said work station and to remove said article from said work station, said lift means rotatable about an axis between a raised position and a lowered position for delivering and removing said article to and from said work station;

retainer means for holding said article with respect to said lift means, said retainer means moveable between a clamped position and a released position;

lock means for locking said retainer means selectively in one of said clamped position and said released position, said lock means moveable between a locked position and an unlocked position in response to rotational movement of said lift means between said raised position and said lowered position, said lock means located adjacent said axis of said lift means; and rail means extending between work stations for supporting said lift means, said lift means moveable between work stations on said rail means.

15. The apparatus of claim 14 further comprising:

said lock means selectively moveable between first and second locking positions corresponding to said clamped position and said released position of said retainer means when in said unlocked position, said lock means in said unlocked position only when said lift means is in said lowered position.

16. The apparatus of claim 14 further comprising:

link means extending between said lock means and said retainer means for transferring movement of said lock means to said retainer means.

17. The apparatus of claim 14 further comprising:

manipulating means at each work station operable when said lift means is at said work station for shifting said lift means from an elevated position to a lowered position, wherein said retainer means is locked in one of said first and second positions until said lift means is shifted into said lowered position.

18. An article handling apparatus for transferring articles of relatively large panel-like form to and from a work station, said apparatus comprising:

lift means for engaging said article to deliver said article to said work station and to remove said article from said work station, said lift means rotatable about an axis between a raised position and a lowered position for delivering and removing said article to and from said work station;

retainer means for holding said article with respect to said lift means, said retainer means moveable between a clamped position and a released position;

lock means for locking said retainer means selectively in one of said clamped position and said released position, said lock means moveable between a locked position and an unlocked position in response to rotational movement of said lift means between said raised position and said lowered position, said lock means having a rotatable member carried on said lift means, said rotatable member having a cam follower connected thereto and selectively engageable with a first cam surface and a second cam surface stationary with respect to rotation of said lift means, and drive means located at each work station for moving said rotatable member to selectively engage said cam follower with one of said first cam surface and said second cam surface, said drive means operable only when said lift means is in said lowered position, said first and second cam surfaces corresponding to said retainer means locked in said clamped position and locked in said released position respectively; and rail means extending between work stations for supporting said lift means, said lift means moveable between work stations on said rail means.

19. The apparatus of claim 18 further comprising:

means for mounting said drive means stationary with respect to said work station and adjacent said axis of said lift means for operable engagement with said rotatable member when said lift member is in said lowered position; and means for biasing said mounting means to permit limited movement of said drive means with respect to said axis of said lift means when said lift means is adjacent said lowered position.

20. The apparatus of claim 18 further comprising:

said drive means including an actuator moveable between first and second end limits of movement, and a coupling member operably connected to said reciprocal actuator and engageable with said rotatable member when said lift means is in said lowered position.

* * * * *